(12) United States Patent
Miller et al.

(10) Patent No.: US 6,556,884 B1
(45) Date of Patent: Apr. 29, 2003

(54) METHOD AND APPARATUS FOR INTERFACING A STATISTICAL PROCESS CONTROL SYSTEM WITH A MANUFACTURING PROCESS CONTROL FRAMEWORK

(75) Inventors: Michael L. Miller, Cedar Park, TX (US); Anatasia L. Oshelski, Austin, TX (US); William J. Campbell, Austin, TX (US)

(73) Assignee: Advanced Micro Devices, Inc., Austin, TX (US)

(*) Notice: Subject to any disclaimer, the term of this patent is extended or adjusted under 35 U.S.C. 154(b) by 369 days.

(21) Appl. No.: 09/596,260

(22) Filed: Jun. 16, 2000

(51) Int. Cl.[7] .............................................. G06F 14/00
(52) U.S. Cl. .................... 700/121; 700/44; 702/174
(58) Field of Search ..................... 700/121, 31, 174, 700/57, 44, 95; 702/174; 716/21

(56) References Cited

U.S. PATENT DOCUMENTS

| | | | |
|---|---|---|---|
| 5,408,405 A | 4/1995 | Mozumder et al. | 700/121 |
| 5,440,493 A * | 8/1995 | Doida | 700/99 |
| 5,546,312 A | 8/1996 | Mozumder et al. | 700/275 |
| 5,576,629 A * | 11/1996 | Turner et al. | 118/708 |
| 5,691,895 A | 11/1997 | Kurtzberg et al. | 703/2 |
| 5,719,796 A | 2/1998 | Chen | 700/98 |
| 5,838,595 A | 11/1998 | Sullivan et al. | 700/29 |
| 5,987,398 A | 11/1999 | Halverson et al. | 702/19 |
| 6,263,255 B1 * | 7/2001 | Tan et al. | 700/106 |

FOREIGN PATENT DOCUMENTS

| | | |
|---|---|---|
| WO | 97/12300 A | 4/1997 |
| WO | 00/00874 A | 1/2000 |
| WO | 01/25865 A | 4/2001 |

\* cited by examiner

*Primary Examiner*—Leo Picard
*Assistant Examiner*—Kidest Bahta
(74) *Attorney, Agent, or Firm*—Williams, Morgan & Amerson, P.C.

(57) ABSTRACT

The present invention provides for a method and an apparatus for interfacing a statistical process control system with a manufacturing control system. A manufacturing model is defined. A processing run of semiconductor devices is processed in a manufacturing facility as defined by the manufacturing model. An advanced process control analysis is performed on the processed semiconductor devices. A statistical process control analysis is performed on the processed semiconductor devices. The manufacturing facility is modified in response to the advanced process control analysis and the statistical process control analysis.

44 Claims, 8 Drawing Sheets

METHOD AND APPARATUS FOR INTERFACING A STATISTICAL PROCESS CONTROL SYSTEM WITH A MANUFACTURING PROCESS CONTROL FRAMEWORK

BACKGROUND OF THE INVENTION

1. Field of the Invention

This invention relates generally to semiconductor products manufacturing, and, more particularly, to a method and apparatus for monitoring process performance using statistical process control and advanced process control.

2. Description of the Related Art

The technology explosion in the manufacturing industry has resulted in many new and innovative manufacturing processes. Today's manufacturing processes, particularly semiconductor manufacturing processes, call for a large number of important steps. These process steps are usually vital, and, therefore, require a number of inputs that are generally fine-tuned to maintain proper manufacturing control.

The manufacture of semiconductor devices requires a number of discrete process steps to create a packaged semiconductor device from raw semiconductor material. The various processes, from the initial growth of the semiconductor material, the slicing of the semiconductor crystal into individual wafers, the fabrication stages (etching, doping, ion implanting, or the like), to the packaging and final-testing of the completed device, are so different from one another and specialized that the processes may be performed in different manufacturing locations that contain different control schemes.

Among the important aspects in semiconductor device manufacturing are RTA control, chemical-mechanical planarization (CMP) control, and overlay control. Overlay is one of several important steps in the photolithography area of semiconductor manufacturing. Overlay control involves measuring the misalignment between two successive patterned layers on the surface of a semiconductor device. Generally, minimization of misalignment errors is important to ensure that the multiple layers of the semiconductor devices are connected and functional. As technology facilitates smaller critical dimensions for semiconductor devices, the need for reduced misalignment errors increases dramatically.

Generally, photolithography engineers currently analyze the overlay errors a few times a month. The results from the analysis of the overlay errors are used to make updates to exposure tool settings manually. Generally, a manufacturing model is employed to control the manufacturing processes. Some of the problems associated with the current methods include the fact that the exposure tool settings are only updated a few times a month. Furthermore, currently the exposure tool updates are performed manually. Many times, errors in semiconductor manufacturing are not organized and reported to quality control personnel. Often, the manufacturing models themselves incur bias errors that could compromise manufacturing quality.

Generally, a set of processing steps is performed on a lot of wafers on a semiconductor manufacturing tool called an exposure tool or a stepper. The manufacturing tool communicates with a manufacturing framework or a network of processing modules. The manufacturing tool is generally connected to an equipment interface. The equipment interface is connected to a machine interface to which the stepper is connected, thereby facilitating communications between the stepper and the manufacturing framework. The machine interface can generally be part of an advanced process control (APC) system. The APC system initiates a control script based upon a manufacturing model, which can be a software program that automatically retrieves the data needed to execute a manufacturing process. Often, semiconductor devices are staged through multiple manufacturing tools for multiple processes, generating data relating to the quality of the processed semiconductor devices. Many times, errors in semiconductor manufacturing are not organized and reported to quality control personnel, which can result in reduced efficiency in manufacturing processes. Errors in the manufacturing model that is used to perform the manufacturing process, such as bias errors, often compromise the quality of manufactured products.

Often, in semiconductor manufacturing, statistical process control (SPC) is used to enhance the production control of manufacturing of semiconductor wafers. SPC is generally used for controlling the production line from a broad-control point of view. SPC generally monitors manufacturing parameters and activates alarms when the manufacturing parameters become out of control; whereas a process controller, such as the APC, performs fault detection and fine-tunes control of manufacturing of semiconductor wafers. The industry currently lacks an efficient means of utilizing the resources of the APC in conjunction with SPC to improve production of semiconductor devices.

The present invention is directed to overcoming, or at least reducing the effects of, one or more of the problems set forth above.

SUMMARY OF THE INVENTION

In one aspect of the present invention, a method is provided for interfacing a statistical process control system with a manufacturing control system. A manufacturing model is defined. A processing run of semiconductor devices is processed in a manufacturing facility as defined by the manufacturing model. An advanced process control analysis is performed on the processed semiconductor devices. A statistical process control analysis is performed on the processed semiconductor devices. The manufacturing facility is modified in response to the advanced process control analysis and the statistical process control analysis.

In another aspect of the present invention, an apparatus is provided interfacing a statistical process control system with a manufacturing control system. The apparatus of the present invention comprises: a processing controller; a processing tool coupled with the processing controller; a metrology tool interfaced with the processing tool; a communications interface coupled with the processing controller, the communications interface being capable of sending feedback signals to the processing controller; a control modification data calculation unit interfaced with the metrology tool and connected to the communications interface in a feedback manner for performing feedback adjustments; a predictor function interfaced with the processing controller; a statistical process control analysis unit interfaced with the predictor function and the processing tool; and a results versus prediction analysis unit interfaced with the statistical process control analysis unit and connected to the communications interface in a feedback manner for performing feedback adjustments.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

There are many discrete processes that are involved in semiconductor manufacturing. Many times, semiconductor devices are stepped through multiple manufacturing process tools. As semiconductor devices are processed through manufacturing tools, production data, or manufacturing data, is generated. The production data can be used to perform fault detection analysis that can lead to improved manufacturing results. Overlay process is an important group of process steps in semiconductor manufacturing. In particular, overlay process involves measuring misalignment errors between semiconductor layers during manufacturing processes. Improvements in the overlay process could result in substantial enhancements, in terms of quality and efficiency, in semiconductor manufacturing processes. The present invention provides a method of acquiring production data and performing fault analysis on a process controller, such as a run-to-run controller, in response to the acquired production data.

Figure 1:
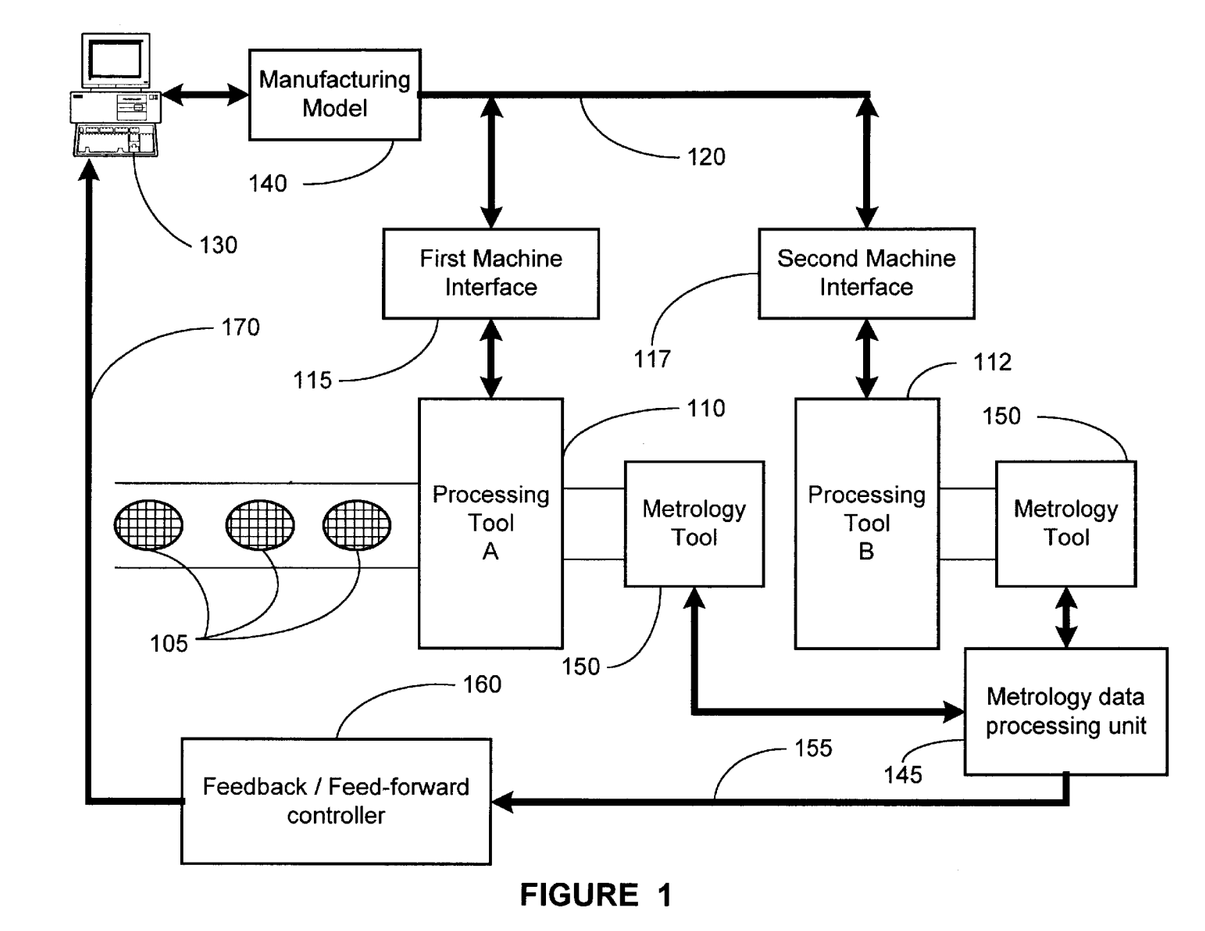
FIG. 1 illustrates one embodiment of the present invention.

Semiconductor devices are processed in a manufacturing environment using a number of input control parameters. Turning now to FIG. 1, one embodiment of the present invention is illustrated. In one embodiment, semiconductor products 105, such as semiconductor wafers are processed on processing tools 110, 112 using a plurality of control input signals on a line 120. In one embodiment, the control input signals on the line 120 are sent to the processing tools 110, 112 from a computer system 130 via machine interfaces 115, 117. In one embodiment, the first and second machine interfaces 115, 117 are located outside the processing tools 110, 112. In an alternative embodiment, the first and second machine interfaces 115, 117 are located within the processing tools 110, 112.

In one embodiment, the computer system 130 sends control input signals on a line 120 to the first and second machine interfaces 115, 117. The computer system 130 employs a manufacturing model 140 to generate the control input signals on the line 120. In one embodiment, the manufacturing model 140 contains a recipe that determines a plurality of control input parameters that are sent on the line 120.

In one embodiment, the manufacturing model 140 defines a process script and input control that implement a particular manufacturing process. The control input signals on a line 120 that are intended for processing tool A 110 are received and processed by the first machine interface 115. The control input signals on a line 120 that are intended for processing tool B 112 are received and processed by the second machine interface 117. Examples of the processing tools 110, 112 used in semiconductor manufacturing processes are steppers, scanners, step-and-scan tools, and etch process tools. In one embodiment, processing tool A 110 and processing tool B 112 are photolithography process tools, such as steppers.

One or more of the semiconductor wafers that are processed by the processing tools 110, 112 are generally sent to a metrology tool 150 for acquisition of metrology data. Data from the metrology tool 150 is processed and organized by the metrology data processing unit 145. In one embodiment, the metrology data processing unit 145 correlates the metrology data to a particular manufacturing lot of processed semiconductor wafers. In one embodiment, the metrology data processing unit 145 is integrated into the computer system 130. In one embodiment, the metrology data processing unit 145 is a computer software program embedded into the computer system 130, wherein the computer system 130 is integrated within the APC framework.

The processed metrology data from the metrology data processing unit 145 is sent to a feedback/feed-forward controller 160 on a line 155. In one embodiment, the feedback/feed-forward controller 160 process the metrology data and generates feedback and feed-forward adjustment data that are known by those skilled in the art. The feedback and feed-forward adjustment data, described below, is sent to the computer system 130 via a line 170. The computer system 130 utilizes the feedback and feed-forward adjustment data to make modifications in the manufacturing model 140, which causes appropriate changes in the control input parameters on the line 120. In one embodiment, the feedback/feed-forward controller 160 is integrated into the computer system 130. In one embodiment, the feedback/feed-forward controller 160 is a computer software program embedded into the computer system 130.

Among the bases for modifying the control input signals on the line 120 are metrology measurements performed on processed semiconductor wafers, such as scatterometry measurements. The metrology measurements are used to perform a feedback modification and a feed-forward modification of the control input signals. Generally, the feedback modification of the control input signals on the line 120 is performed on photolithography processes, such as line width adjustments using photo exposure dosages and line profile adjustments using exposure focus modifications. Feedback modification of the control input signals on the line 120 can also be performed on etch processes, such as etch line shape adjustments using etch recipe modifications.

Feed-forward modification of the control input signals on the line 120 can be used to perform corrections of subsequent processes on the semiconductor wafers. Feed-forward modification of the control input signals on the line 120 can be used in spacer deposition processes, where scatterometry techniques can be used to adjust effective line widths of precision forms on semiconductor wafers. In one embodiment, in a spacer deposition process, scatterometry measurements can be used to adjust deposition time, which may impact the spacer width, which in turn would impact the effective line width of a trace on a semiconductor wafer. Furthermore, scatterometry measurements can be used to measure the ion implantation parameters and adjust ion implant dosage on subsequent ion implant processes.

In the context of a manufacturing process, such as a stepper process, the control inputs on the line 120 that are used to operate the processing tool 110 include an x-translation signal, a y-translation signal, an x-expansion wafer scale signal, a y-expansion wafer scale signal, a reticle magnification signal, and a reticle rotation signal. Generally, errors associated with the reticle magnification signal and the reticle rotation signal relate to one particular exposure process on the surface of the wafer being processed in the exposure tool. One of the primary features taught by the present invention is a method of updating control input signals on the line 120 in response to an analysis of external variables.

When a process step in the processing tool 110 is concluded, the semiconductor wafer that is being processed in the processing tool 110 is examined in a review station. One such review station is a KLA review station. One set of data derived from the operation of the review station is a quantitative measure of the amount of misregistration that was caused by the previous exposure process. In one embodiment, the amount of misregistration relates to the misalignment in the process that occurred between two layers of a semiconductor wafer. In one embodiment, the amount of misregistration that occurred can be attributed to the control inputs to a particular exposure process. The control inputs generally affect the accuracy of the process steps performed by the exposure tools on the semiconductor wafer. The control input signals affect the reticle magnification and the position of the semiconductor wafer that is being processed. Modifications of the control inputs can be utilized to improve the performance of the process steps employed in the exposure tool. In one embodiment, the modifications to the control input signals on the line 120 are based on the effects of external variables on the semiconductor devices being processed. Much of the components illustrated in FIG. 1 are integrated into a process control system, such as the APC.

Figure 2:
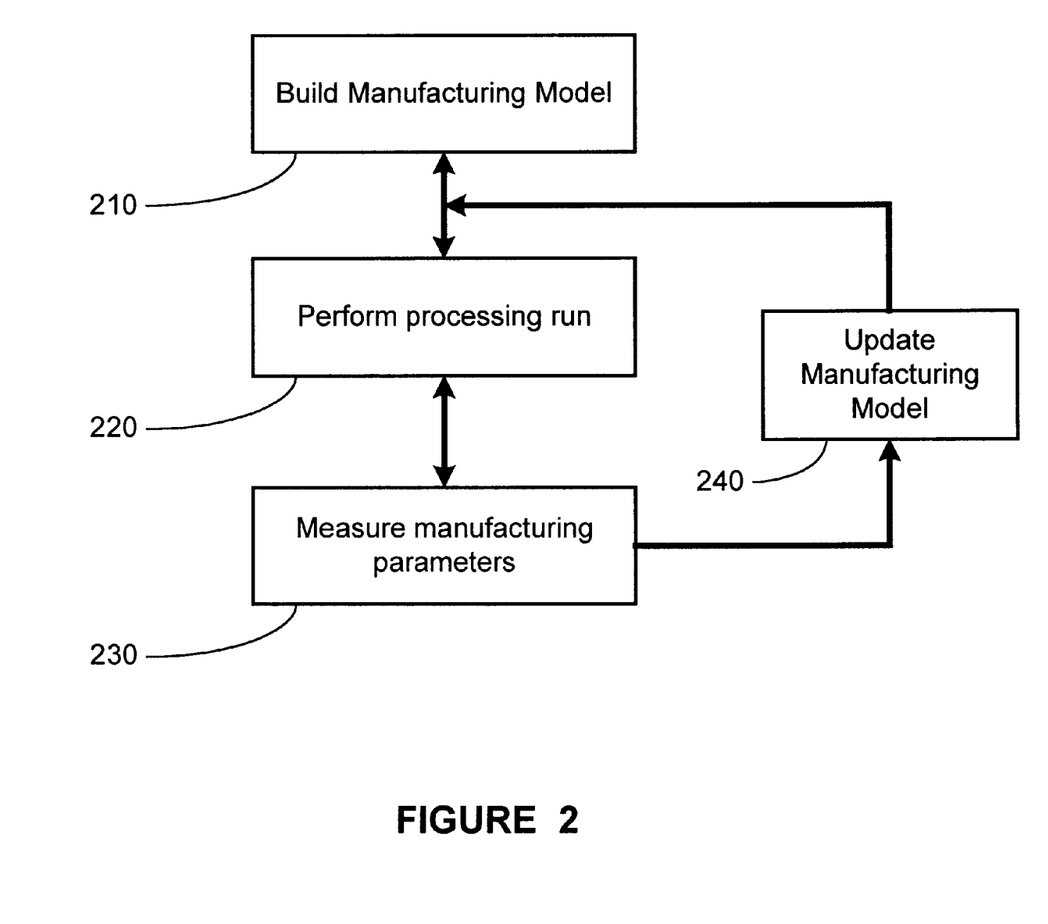
FIG. 2 illustrates a flowchart representation of one method of updating a manufacturing model.

Turning now to FIG. 2, a flowchart representation of one embodiment of a process for updating the manufacturing model 140 is illustrated. In one embodiment, the manufacturing model 140 that is used by a process controller, such as an Advanced Process Control (APC) system, is defined, as described in block 210 of FIG. 2. Once the manufacturing model 140 is defined, a manufacturing run of semiconductor devices, such as semiconductor wafers, is performed, as described in block 220 of FIG. 2. When the manufacturing run of semiconductor wafers is complete, a set of production data is collected, including measuring a plurality of wafer parameters, as described in block 230 of FIG. 2. The wafer parameters include misalignment and misregistration errors during photolithography processes. The wafer parameters also include measuring post-polish thickness errors during a polishing process.

In one embodiment, the production data is used to update the manufacturing model 140, which is used by the process controller to modify control input signals for a subsequent manufacturing run of semiconductor wafers, as described in block 240 of FIG. 2. The run-to-run controller then implements the next manufacturing run of semiconductor wafers and the feedback process is repeated as illustrated in FIG. 2. In general, an ideal manufacturing model 140 would result in random production errors that are distributed evenly over a Guassian-type error curve. However, due to the non-ideal characteristics of manufacturing models 140, non-random errors could occur. An error bias can develop within the manufacturing model, resulting in consistent errors during semiconductor manufacturing.

In some manufacturing processes, there are over 300 process steps that are defined by a manufacturing model 140 and are implemented on a semiconductor wafer. A change in any one of the process steps can affect other related process steps such that the manufacturing model 140 that defines the process steps can become inaccurate. In some cases a chain reaction in the production of semiconductor wafers caused by a change in a particular process step can cause the manufacturing model 140 to no longer describe the process steps well, causing errors in production. In other words, a bias is created in the manufacturing model 140 such that there is a consistent defect in the processed semiconductor wafers. For example, if the original manufacturing model was designed to generate semiconductor wafers with zero overlay error, a bias in the manufacturing model 140 can cause a 10 micro-meter misalignment error in every semiconductor wafer that is processed under the control of the manufacturing model 140. In other words, there is noise in the manufacturing system that is implemented in the manufacturing model 140 that causes non-random errors that are outside a normal Guassian error curve.

Furthermore, the aging of a manufacturing model 140 may cause degradation of output products that are manufactured within the manufacturing model 140 structure. In other words, gradually over time, a manufacturing model 140 can change its prior behavior. One example of aging of the manufacturing model 140 is degradation of lamps in an exposure tool. Implementation of the methods taught by the present invention can reduce the effects of aging of manufacturing models 140. The present invention teaches a method of implementing a statistical process control analysis method for reducing the bias and noise in manufacturing systems.

In one embodiment, statistical process control (SPC) is a method of monitoring, controlling, and, ideally, improving a process through statistical analysis. In one embodiment, SPC analysis is comprised of four main steps. The main steps of SPC analysis include measuring the process, reducing variances in the process to make the process more consistent, monitoring the process, and improving the process to produce its best value. In real-time SPC, which can be used for run-to-run control applications in one embodiment, data is collected from the most recently finished manufacturing run of semiconductor wafers before the next manufacturing run of semiconductor wafers is processed. Steps are taken to ensure that the quality of the processed semiconductor wafers are as consistent as possible from one manufacturing run to another. Generally, SPC analysis rules dictate that causes of errors discovered during one manufacturing run of semiconductor wafers must be corrected before the next manufacturing run of semiconductor wafers is performed. SPC is generally used for controlling the production line from a broad-control point of view. SPC generally monitors manufacturing parameters and activates alarms when the manufacturing parameters become out of control.

Figure 3:
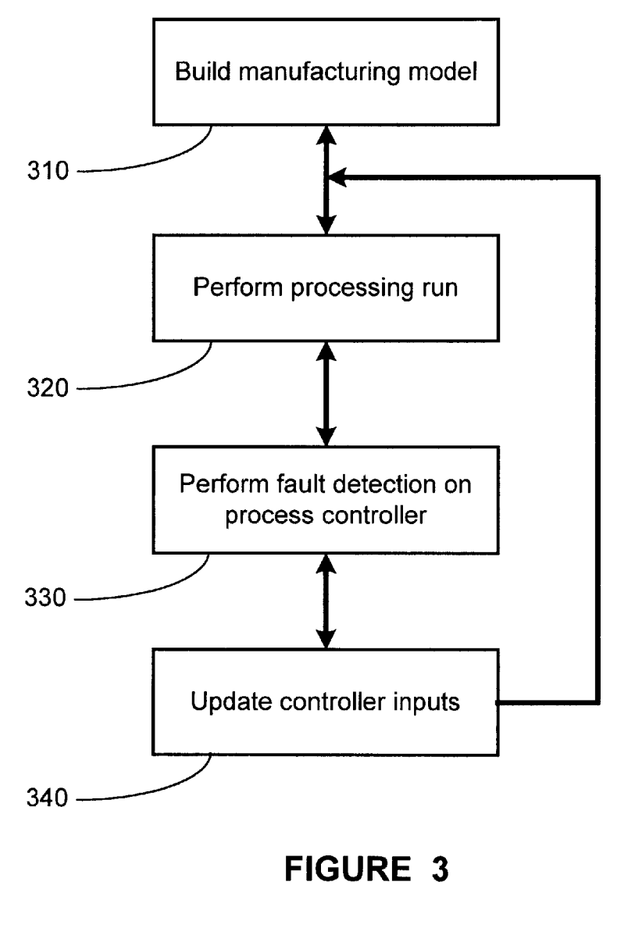
FIG. 3 illustrates a flowchart representation of the methods taught by the present invention.

Turning now to FIG. 3, a flowchart depiction of one embodiment of the present invention is illustrated. In one embodiment, a manufacturing model 140 that is used by a process controller, such as an Advanced Process Control (APC) system, is defined, as described in block 310 of FIG. 3. Once the manufacturing model 140 is defined, a manufacturing run of semiconductor devices, such as semiconductor wafers, is performed, as described in block 320 of FIG. 3. When a manufacturing run of semiconductor wafers is completed, a fault detection analysis is performed on the process controller, as described in block 330 of FIG. 3. In one embodiment, the fault detection analysis is performed on a process controller that is a run-to-run controller. A more detailed depiction of the step of performing fault detection analysis, described in block 330 of FIG. 3, is illustrated in FIG. 4.

Figure 4:
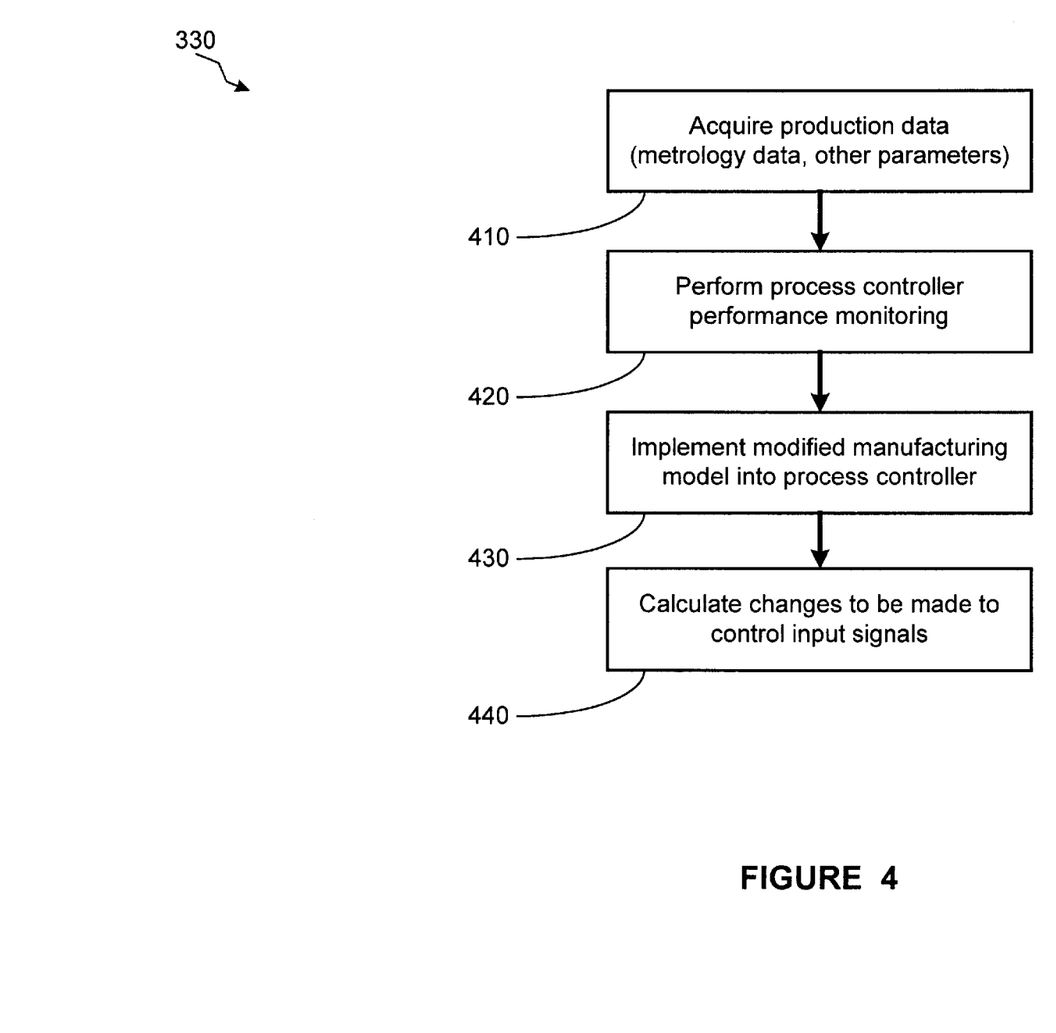
FIG. 4 illustrates a flowchart representation of a more detailed depiction of the step of performing fault detection on a run-to-run controller described in FIG. 3.

Turning now to FIG. 4, after a manufacturing run of semiconductor wafers is completed, the corresponding production data is acquired, as described in block 410 of FIG. 4. The production data that is acquired includes misalignment errors, misregistration errors, critical dimension errors, polishing thickness errors, and the like. Once production data is acquired, a process controller performance monitoring step is performed, as described in block 420 of FIG. 4. A more detailed depiction of the step of performing process controller performance monitoring, described in block 420 of FIG. 4, is illustrated in FIG. 5.

Figure 5:
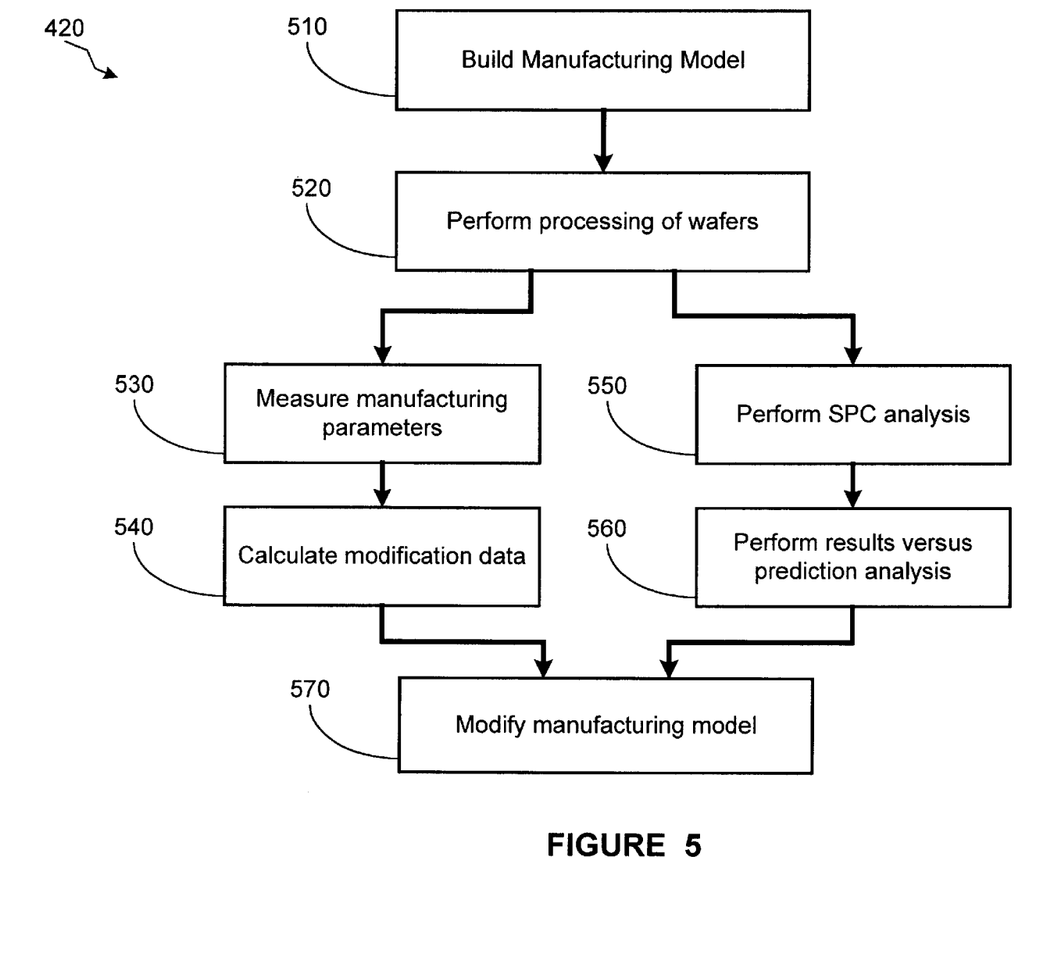
FIG. 5 illustrates a flowchart representation of a more detailed depiction of the step of performing process controller performance monitoring described in FIG. 4.

Turning now to FIG. 5, one embodiment of performing process controller performance monitoring is illustrated. In one embodiment, a manufacturing model 140 that is used by a process controller is defined, as described in block 510 of FIG. 5. Subsequently, semiconductor wafers are processed using the manufacturing model, as described in block 520 of FIG. 5. Once a set of semiconductor wafers is processed, manufacturing parameters, such as production data, are measured, as described in block 530 of FIG. 5. The manufacturing parameters that are measured include misalignment errors, misregistration errors, critical dimension errors, and polishing thickness error. In one embodiment, manufacturing parameters are measured using metrology tools.

Once the manufacturing parameters are measured, modification data is calculated for modifying parameters defined by the manufacturing model 140, as described in block 540 of FIG. 5. Concurrently, SPC analysis, which is described above, is performed after processing of semiconductor wafers, as described in block 550 of FIG. 5. In one embodiment, while performing SPC analysis, a prediction is made regarding the expected process behavior for a particular manufacturing model 140. After processing a set of semiconductor wafers, the results from analysis of the semiconductor wafers are compared with the predicted process behavior, as described in block 560 of FIG. 5. In other words, a judgment is made regarding how different the actual results from a processing step are from a set of predicted results for that processing step. In one embodiment, standard SPC calculation methods that are known to those skilled in the art, and having the benefit of the present disclosure, are employed for SPC analysis for the present invention.

The difference between the predicted process results and the actual process results is used to determine whether the manufacturing model 140 should be modified for the next manufacturing run of semiconductor wafers, thereby performing fault detection upon a run-to-run controller. Using results obtained by measuring manufacturing parameters and performing SPC analysis, the manufacturing model 140 is then modified to be used for subsequent manufacturing processes, as described in block 570 of FIG. 5. The modification of the manufacturing model 140 described in block 570 completes the step of performing process control performance monitoring that is described in block 420 of FIG. 4.

Turning back to FIG. 4, once the manufacturing model 140 is modified, the modified manufacturing model 140 is implemented into the process controller that controls subsequent processing of semiconductor devices, as described in block 430 of FIG. 4. Modification factors needed to make modification to the control input signals on the line 120 are calculated, as described in block 440 of FIG. 4. The completion of the calculations described in block 440 of FIG. 4 completes the step of performing fault detection analysis on the process controller that is described in block 330 of FIG. 3. Turning back to FIG. 3, once calculations for modifying control input signals are made, the control input signal on the line 120 are modified to be used for a subsequent manufacturing run of semiconductor wafers, as described in block 340 of FIG. 3.

Figure 6:
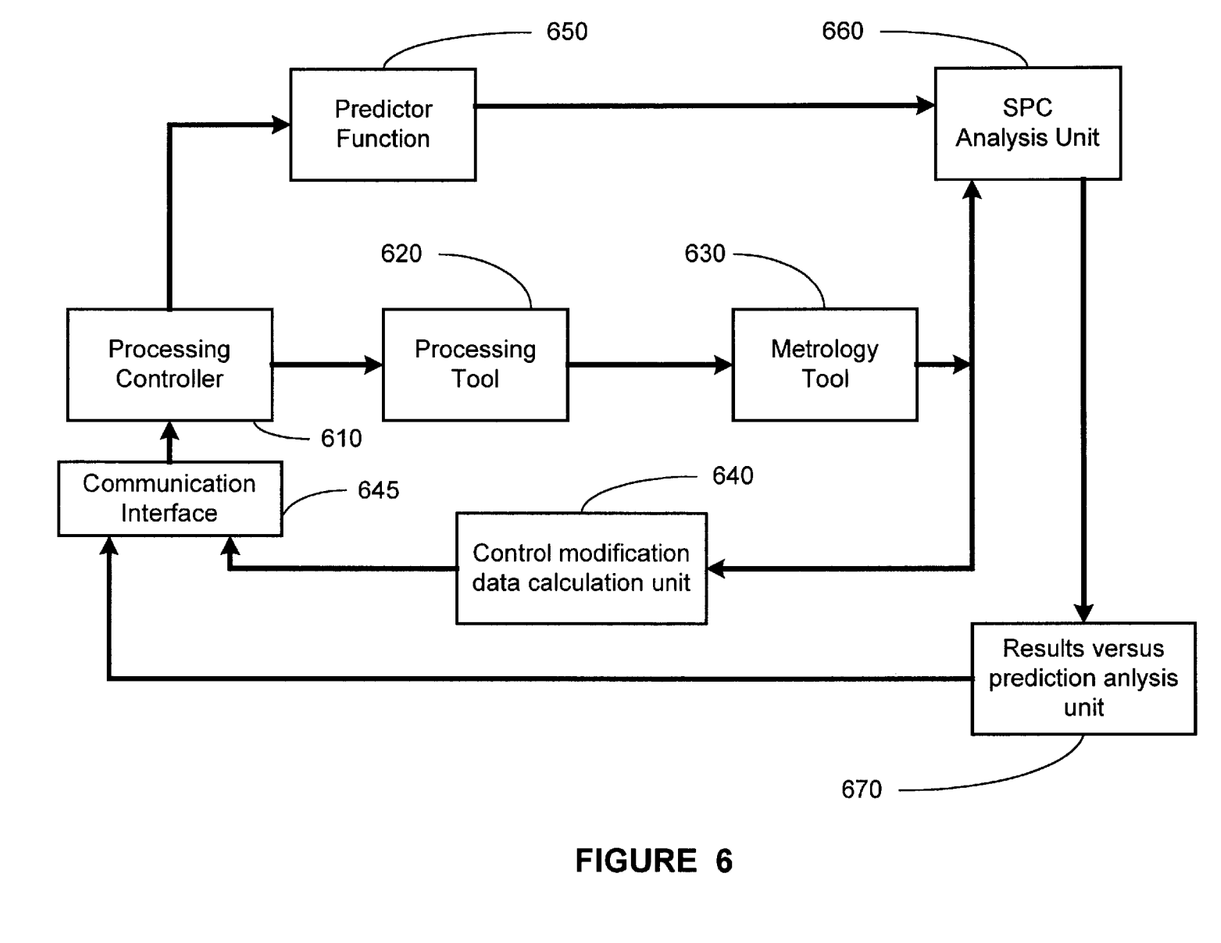
FIG. 6 illustrates a block diagram representation of the apparatus taught by the present invention.

Turning now to FIG. 6, one embodiment of the apparatus for implementing the principles taught by the present invention is illustrated. An inner feedback loop is created between a processing controller 610, a processing tool 620, a metrology tool 630, and a control modification data calculation unit 640. In one embodiment, the inner feedback loop defines the major components of the APC system. The processing controller 610 is interfaced with the processing tool 620. In one embodiment, the processing controller 610 calculates and sends control input signals that control the function of the processing tool 620. The processing tool 620 is interfaced with the metrology tool 630, which measures manufacturing parameters on semiconductor wafers that are processed by the processing tool 620.

The metrology tool 630 is interfaced with the control modification data calculation unit 640. The control modification data calculation unit 640 uses data provided by the metrology tool 630 to perform calculations for the modification of control input signals that are generated by the processing controller 610. In one embodiment, the control modification data calculation unit 640 is a computer program that is interfaced with the processing controller 610. Data from the control modification data calculation unit 640 is sent to a communication interface 645. The communication interface 645 is coupled with the control modification data calculation unit 640 and the processing controller 610. Data from the control modification data calculation unit 640 is utilized by the processing controller 610 to modify control input signals that are sent to the processing tool 620 for subsequent processing of semiconductor wafers.

Concurrently, an outer feedback loop is created between the processing controller 610, the processing tool 620, the predictor function 650, the SPC analysis unit 660, and the results versus prediction analysis unit 670. In one embodiment, the outer feedback loop defines the major components of the SPC system. The predictor function 650 is interfaced with the processing controller 610 and predicts an expected result of a manufacturing run of semiconductor wafers, based on the control input signals generated by the processing controller 610. In one embodiment, the predictor function 650 is a computer program and is located within a manufacturing model 140. Data from the processed semiconductor wafers is used by the SPC analysis unit 660 to perform SPC analysis.

In one embodiment, the SPC analysis unit 660 is a computer program that is interfaced with the manufacturing model 140. The results versus prediction analysis unit 670 calculates the differences between the predicted results of a manufacturing run of semiconductor wafers and the actual results of a manufacturing run of semiconductor wafers. In one embodiment, the results versus prediction analysis unit 670 is a computer program. The data calculated by the results versus prediction analysis unit 670 is used by the processing controller 610 to modify control input signals for a subsequent manufacturing run of semiconductor wafers that is performed by the processing tool 620. The data from the prediction analysis unit 670 is sent to the communications interface 645. The communications interface 645 is coupled with the prediction analysis unit 670 and the processing controller 610. The processing controller 610 receives feedback from the inner feedback loop (APC system) and the outer feedback loop (SPC system) though the communications interface 645. The processing controller 610 utilizes the data from the communications interface 645 to control the manufacturing of semiconductor wafers more efficiently and more precisely.

Figure 7:
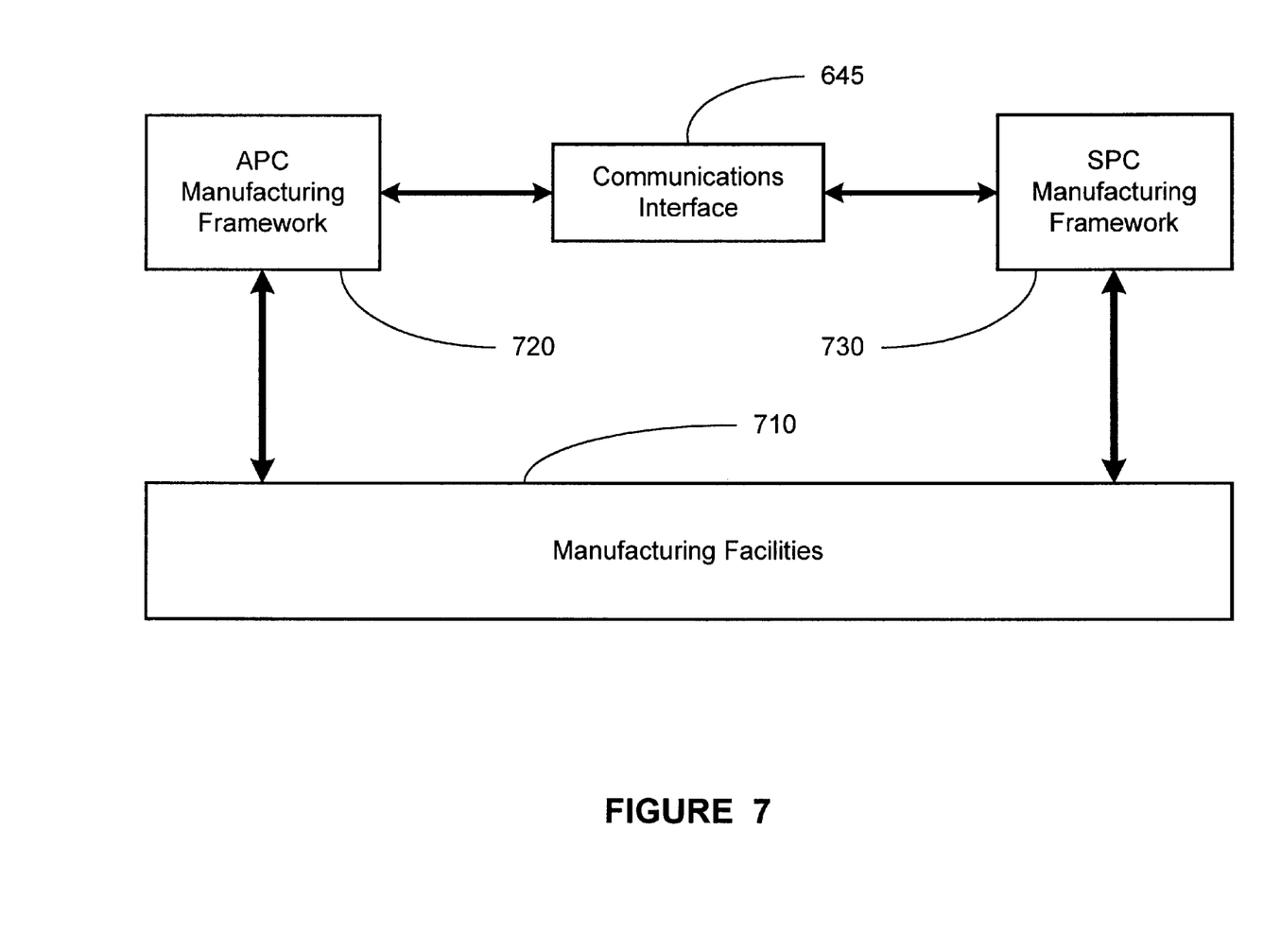
FIG. 7 illustrates one embodiment of the apparatus integrating an APC system with an SPC system.

Turning now to FIG. 7, one embodiment of an apparatus integrating the APC system with the SPC system is illustrated. A manufacturing facility 710 is controlled by an APC manufacturing framework 720 and an SPC manufacturing framework 730. In one embodiment, the manufacturing facility 710 comprises a plurality of processing tools 110, 112, metrology tools 150, and a computer system 130 that is integrated with the APC manufacturing framework 720. Among other tasks, the APC manufacturing framework 720 performs fault detection and other fine-tune control applications in the manufacturing of semiconductor wafers. The SPC manufacturing framework 730 is generally used for controlling the production line from a broad-control point of view. The SPC manufacturing framework 730 generally monitors manufacturing parameters and activates alarms when the manufacturing parameters become out of control.

The APC manufacturing framework 720 is integrated with the SPC manufacturing framework 730 by coupling the APC manufacturing framework 720 and the SPC manufacturing framework 730 via the communications interface 645. The communications interface 645 facilitates data communications directly between the APC manufacturing framework 720 and the SPC manufacturing framework 730. Therefore, SPC calculations and SPC-generated warning signals can be sent to the APC manufacturing framework 720. Also, calculations and warning signals generated by the APC manufacturing framework 720 can be sent to the SPC manufacturing framework 730. In one embodiment, the communications interface 645 is a computer software program that is capable of facilitating data communication between two separate software and hardware entities. In one embodiment, the communications interface 645 is a Common Object Request Broker Architecture (CORBA) system.

Figure 8:
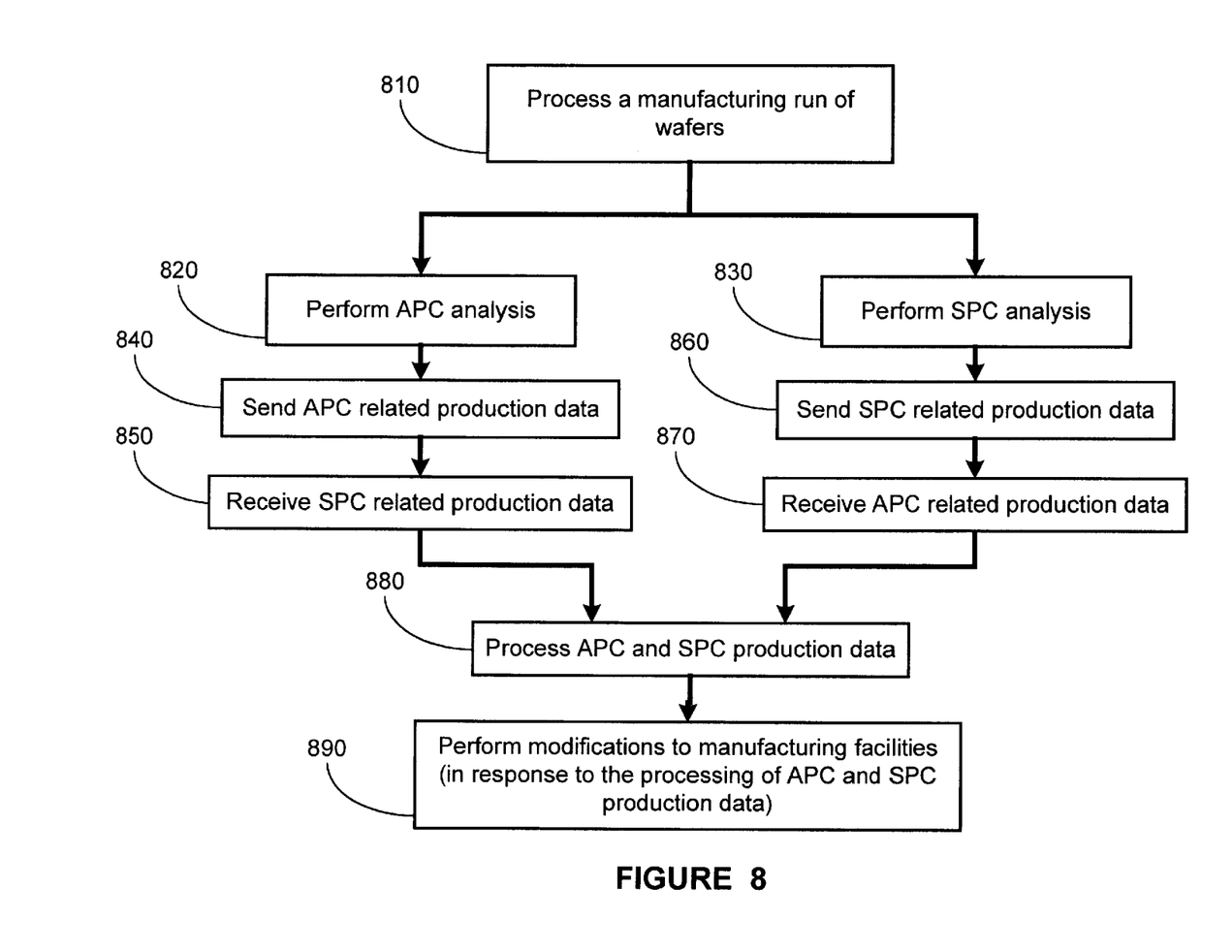
FIG. 8 illustrates a flowchart depiction of one embodiment of the method for integrating an APC framework and an SPC framework.

Turning now to FIG. 8, a flowchart depiction of one embodiment of the method for integrating an APC framework and an SPC framework is illustrated. A manufacturing run of semiconductor wafers is processed, as described in block 810 of FIG. 8. At a time period during and after processing of the semiconductor wafers, an APC analysis is performed, as described in block 820 of FIG. 8. APC analysis includes acquiring metrology data, performing fault detection, performing fault analysis, implementing feedback corrections, and implementing feed-forward corrections. The APC analysis also includes driving run-to-run controllers that compensate for errors from one manufacturing run of semiconductor wafers to another. Generally, the APC analysis will compensate for relatively small drifts and relatively small shifts in the manufacturing process.

Concurrent to the APC analysis, at a time period during and after processing of the semiconductor wafers, an SPC analysis is performed, as described in block 830 of FIG. 8. SPC analysis includes monitoring, controlling, and, ideally, improving a process through statistical analysis. Generally, the SPC analysis will compensate for relatively large drifts and relatively large shifts in the manufacturing process. The SPC analysis can produce warning signals, such as alarms, that can prompt a temporary termination of a production run of semiconductor wafers.

Data collected from the APC analysis is sent to the SPC manufacturing framework 730, via the communications interface 645, as described in block 840 of FIG. 8. Data and warning signals from the SPC analysis is received by the APC manufacturing framework 720, as described in block 850 of FIG. 8. Data collected from the SPC analysis is sent to the APC manufacturing framework 720, via the communications interface 645, as described in block 860 of FIG. 8. Data and warning signals from the APC analysis is received by the SPC manufacturing framework 730, as described in block 870 of FIG. 8.

The APC manufacturing framework 720 then processes the SPC data and the SPC manufacturing framework 730 processes the APC data, as described in block 880 of FIG. 8. When a manufacturing process becomes significantly out of control, APC manufacturing framework 720 may not be able to correct the problem in an acceptable period of time. However, when the APC manufacturing framework 720 receives a warning signal from the SPC manufacturing framework 730, a more drastic measure can be taken by the APC manufacturing framework 720, such as temporarily halting production processes.

Likewise, the SPC manufacturing framework 730 monitors the data and the warning signals from the APC manufacturing framework 720. The SPC manufacturing framework 730 can make manufacturing decisions, such as sounding its own alarm due to warning signals received from the APC manufacturing framework 720, based upon data received from the APC manufacturing framework 720. The cooperation between the APC manufacturing framework 720 and the SPC manufacturing framework 730 can result in more accurate and efficient operation of the manufacturing facilities 710. The production data resulting from the APC analysis and the SPC analysis is used to generate modifications to the manufacturing facilities 710, as described in block 890 of FIG. 8. The modifications made to the manufacturing facilities include modifying the manufacturing model 140, modifying the control input parameters on the line 120, calibrating metrology tools, cleaning or repairing processing tools 110, 112, and the like. The principles taught by the present invention can be implemented into other types of manufacturing frameworks.

The principles taught by the present invention can be implemented in an Advanced Process Control (APC) framework and a Statistical Process Control (SPC) framework. The APC is a preferred platform from which to implement the overlay control strategy taught by the present invention. In some embodiments, the APC can be a factory-wide software system, therefore, the control strategies taught by the present invention can be applied to virtually any of the semiconductor manufacturing tools on the factory floor. The APC framework also allows for remote access and monitoring of the process performance. Furthermore, by utilizing the APC framework, data storage can be more convenient, more flexible, and less expensive than local drives. The APC platform allows for more sophisticated types of control because it provides a significant amount of flexibility in writing the necessary software code.

Deployment of the control strategy taught by the present invention onto the APC framework could require a number of software components. In addition to components within the APC framework, a computer script is written for each of the semiconductor manufacturing tools involved in the control system. When a semiconductor manufacturing tool in the control system is started in the semiconductor manufacturing fab, it generally calls upon a script to initiate the action that is required by the process controller, such as the overlay controller. The control methods are generally defined and performed in these scripts. The development of these scripts can comprise a significant portion of the development of a control system.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method, comprising:
   defining a manufacturing model;
   processing semiconductor devices in a manufacturing facility as defined by said manufacturing model;
   performing a process control analysis on the processed semiconductor devices using a process controller, said process control analysis comprising acquiring metrology data relating to said processing of semiconductor devices;
   performing a statistical process control analysis on said processed semiconductor devices using an SPC controller;
   interfacing said process controller and said SPC controller; and
   modifying said manufacturing model in response to said process control analysis and said statistical process control analysis, during at least a portion of the time period when said semiconductor devices are processed.

2. The method described in claim 1, wherein defining a manufacturing model further comprises defining a manufacturing model that describes a photolithography process for semiconductor devices.

3. The method described in claim 1, wherein defining a manufacturing model further comprises defining a manufacturing model that describes an etching process for semiconductor devices.

4. The method described in claim 1, wherein defining a manufacturing model further comprises defining a manufacturing model that describes a deposition process for semiconductor devices.

5. The method described in claim 1, wherein defining a manufacturing model further comprises defining a manufacturing model that describes an implantation process for semiconductor devices.

6. The method described in claim 1, wherein defining a manufacturing model further comprises defining a manufacturing model that describes a chemical-mechanical polishing process for semiconductor devices.

7. The method described in claim 1, wherein performing a process control analysis further comprises performing a fault detection analysis.

8. The method described in claim 7, wherein performing a fault detection analysis further comprises:
   acquiring production data;
   performing process controller performance monitoring using said production data;
   modifying said manufacturing model in response to said process controller performance monitoring; and
   implementing said modified manufacturing model in said process controller.

9. The method described in claim 8, wherein acquiring production data further comprises acquiring metrology data using a metrology tool.

10. The method described in claim 1, wherein performing a statistical process control analysis further comprises:
    measuring a manufacturing parameter;
    calculating modification data based upon said manufacturing parameter;
    performing statistical process control analysis;
    performing results versus prediction analysis based upon said statistical process control analysis; and
    modifying said manufacturing model based upon said calculated modification data and said results versus prediction analysis.

11. The method described in claim 10, wherein measuring manufacturing parameter further comprises measuring metrology data using a metrology tool.

12. The method described in claim 10, wherein measuring metrology data further comprises measuring a misalignment error on a semiconductor wafer.

13. The method described in claim 10, wherein measuring metro logy data further comprises measuring a misregistration on a semiconductor wafer.

14. The method described in claim 10, wherein measuring metrology data further comprises measuring polish thickness error on a semiconductor wafer.

15. The method described in claim 10, wherein performing results versus prediction analysis further comprises comparing a predicted manufacturing process behavior to a result of a measured manufacturing process.

16. A system, comprising:
    a processing controller;
    a processing tool coupled with said processing controller;
    a metrology tool interfaced with said processing tool;
    a communications interface coupled with said processing controller, said communications interface being capable of sending feedback signals to said processing controller;
    a control modification data calculation unit interfaced with said metrology and connected to said communications interface in a feedback manner for performing feedback adjustments;
    a predictor function interfaced with said processing controller;

an statistical process control analysis unit interfaced with said predictor function and said processing tool; and a results versus prediction analysis unit interfaced with said statistical process control analysis unit and connected to said communications interface in a feedback manner for performing feedback adjustments.

17. The system described in claim 16, wherein said processing controller is a run-to-run controller.

18. The system described in claim 16, wherein said processing controller is an automatic process control (APC) system.

19. The system described in claim 16, wherein said control modification data calculation unit is a computer software program integrated into said processing controller.

20. The system described in claim 16, wherein said predictor function is a computer software program integrated into a manufacturing model.

21. The system described in claim 16, wherein said statistical process control analysis unit is a computer software program.

22. The system described in claim 16, wherein said results versus prediction analysis unit is a computer software program.

23. An apparatus, comprising:

a manufacturing facility capable of manufacturing semiconductor devices;

an automatic process control manufacturing framework coupled with said manufacturing facility, said automatic process control manufacturing framework being capable of performing fine-tune adjustments to said manufacturing facility;

a statistical process control manufacturing framework coupled with said manufacturing facility, said automatic process control manufacturing framework being capable of performing large scale adjustments to said manufacturing facility; and a communications interface coupled with said automatic process control manufacturing framework and said statistical process control manufacturing framework, wherein said communication interface facilitates communication between said automatic process control manufacturing framework and said statistical process control manufacturing framework.

24. An apparatus for monitoring controller performance using statistical process control analysis, comprising:

means for defining a manufacturing model;

means for processing semiconductor devices in a manufacturing facility as defined by said manufacturing model;

means for performing a process control analysis on the processed semiconductor devices using a process controller, said process control analysis comprising acquiring metrology data relating to said processing of semiconductor devices;

means for performing a statistical process control analysis on said processed semiconductor devices using an SPC controller;

means for interfacing said process controller and said SPC controller; and means for modifying said manufacturing model in response to said process control analysis and said statistical process control analysis during at least a portion of the time period when said semiconductor devices are processed.

25. A computer readable program storage device encoded with instructions that, when executed by a computer, performs a method, comprising:

defining a manufacturing model;

processing semiconductor devices in a manufacturing facility as defined by said manufacturing model;

performing a process control analysis on the processed semiconductor devices using a process controller, said process control analysis comprising acquiring metrology data relating to said processing of semiconductor devices;

performing a statistical process control analysis on said processed semiconductor devices using an SPC controller;

interfacing said process controller and said SPC controller; and modifying said manufacturing model in response to said process control analysis and said. statistical process control analysis, during at least a portion of the time period when said semiconductor devices are processed.

26. The computer readable program storage device encoded with instructions that, when executed by a computer, performs the method described in claim 25, wherein defining a manufacturing model further comprises defining a manufacturing model that describes a photolithography process for semiconductor devices.

27. The computer readable program storage device encoded with instructions that, when executed by a computer, performs the method described in claim 25, wherein defining a manufacturing model further comprises defining a manufacturing model that describes an etching process for semiconductor devices.

28. The computer readable program storage device encoded with instructions that, when executed by a computer, performs the method described in claim 1, wherein defining a manufacturing model further comprises defining a manufacturing model that describes a deposition process for semiconductor devices.

29. The computer readable program storage device encoded with instructions that, when executed by a computer, performs the method described in claim 25, wherein defining a manufacturing model further comprises defining a manufacturing model that describes an implantation process for semiconductor devices.

30. The computer readable program storage device encoded with instructions that, when executed by a computer, performs the method described in claim 25, wherein defining a manufacturing model further comprises defining a manufacturing model that describes a chemical-mechanical polishing process for semiconductor devices.

31. The computer readable program storage device encoded with instructions that, when executed by a computer, performs the method described in claim 25, wherein performing a process control analysis further comprises performing a fault detection analysis.

32. The computer readable program storage device encoded with instructions that, when executed by a computer, performs the method described in claim 31, wherein performing a fault detection analysis further comprises:

acquiring production data;

performing process controller performance monitoring using said production data;

modifying said manufacturing model in response to said process controller performance monitoring; and implementing said modified manufacturing model in said process controller.

33. The computer readable program storage device encoded with instructions that, when executed by a computer, performs the method described in claim 32, wherein acquiring production data further comprises acquiring metrology data using a metrology tool.

34. The computer readable program storage device encoded with instructions that, when executed by a computer, performs the method described in claim 25, wherein performing a statistical process control analysis further comprises:
measuring a manufacturing parameter;
calculating modification data based upon said manufacturing parameter;
performing statistical process control analysis;
performing results versus prediction analysis based upon said statistical process control analysis; and
modifying said manufacturing model based upon said calculated modification data and said results versus prediction analysis.

35. The computer readable program storage device encoded with instructions that, when executed by a computer, performs the method described in claim 34, wherein measuring said manufacturing parameter further comprises measuring metrology data using a metrology tool.

36. The computer readable program storage device encoded with instructions that, when executed by a computer, performs the method described in claim 34, wherein measuring metrology data further comprises measuring a misalignment error on a semiconductor wafer.

37. The computer readable program storage device encoded with instructions that, when executed by a computer, performs the method described in claim 34, wherein measuring metrology data further comprises measuring a misregistration on a semiconductor wafer.

38. The computer readable program storage device encoded with instructions that, when executed by a computer, performs the method described in claim 34, wherein measuring metrology data further comprises measuring polish thickness error on a semiconductor wafer.

39. The computer readable program storage device encoded with instructions that, when executed by a computer, performs the method described in claim 34, wherein performing results versus prediction analysis further comprises comparing a predicted manufacturing process behavior to a result of a measured manufacturing process.

40. A method, comprising:
providing a process controller to control processing of a semiconductor wafer;
processing said semiconductor wafer;
providing a Statistical Process Control (SPC) controller to perform a SPC analysis;
interfacing said SPC controller with said process controller; and
performing substantially concurrent fault detection and process control based upon said interfacing of said SPC controller and said process controller, during at least a portion of the time during processing of a semiconductor wafer.

41. The method of claim 40, further comprising providing a manufacturing model to control said processing of said semiconductor wafer.

42. The method of claim 41, further comprising modifying said manufacturing model to reduce a bias in said manufacturing model based upon said interfacing of said process controller and said SPC controller.

43. The method described in claim 41, wherein performing a fault detection analysis further comprises:
acquiring production data;
performing a process controller performance monitoring using said production data;
modifying said manufacturing model in response to said process controller performance monitoring; and
implementing said modified manufacturing model in said process controller.

44. The method described in claim 41, wherein performing said SPC analysis further comprises:
measuring a manufacturing parameter;
calculating modification data based upon said manufacturing parameter;
performing statistical process control analysis;
performing results versus prediction analysis based upon said statistical process control analysis; and
modifying said manufacturing model based upon said calculated modification data and said results versus prediction analysis.

* * * * *